(12) United States Patent
Masuda (10) Patent No.: US 8,516,239 B2
(45) Date of Patent: Aug. 20, 2013

(54) VIRTUAL AUTHENTICATION PROXY SERVER AND TERMINAL AUTHENTICATION SERVER

(75) Inventor: Yoshihiro Masuda, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 270 days.

(21) Appl. No.: 12/910,895

(22) Filed: Oct. 25, 2010

(65) Prior Publication Data

US 2011/0264910 A1      Oct. 27, 2011

(30) Foreign Application Priority Data

Apr. 23, 2010   (JP) ................................ 2010-099671

(51) Int. Cl.
*H04L 29/06* (2006.01)

(52) U.S. Cl.
USPC ........................................... 713/150; 713/155

(58) Field of Classification Search
USPC ............................................. 713/155; 726/3
See application file for complete search history.

(56) References Cited

U.S. PATENT DOCUMENTS

| 8,060,916 | B2 * | 11/2011 | Bajaj et al. ........................ 726/3 |
| 2005/0223217 | A1 * | 10/2005 | Howard et al. ............... 713/155 |
| 2009/0235345 | A1 | 9/2009 | Oikawa et al. |
| 2010/0138663 | A1 * | 6/2010 | Silverbrook et al. ......... 713/179 |
| 2010/0287369 | A1 * | 11/2010 | Monden ........................ 713/156 |

FOREIGN PATENT DOCUMENTS

| JP | 11-282804 | A | 10/1999 |
| JP | 2000-132475 | A | 5/2000 |
| JP | 2001-177513 | A | 6/2001 |
| JP | 2003-186846 | A | 7/2003 |
| JP | 2005-157822 | A | 6/2005 |
| JP | 2006-005503 | A | 1/2006 |
| JP | 2009-223452 | A | 10/2009 |

* cited by examiner

*Primary Examiner* — Edward Zee
*Assistant Examiner* — Chi Nguy
(74) *Attorney, Agent, or Firm* — Sughrue Mion, PLLC (57) ABSTRACT

A virtual authentication proxy server includes an authentication request acceptance unit, a terminal authentication program transmission unit and an authentication result transmission unit. When an application server which cannot use an authentication server accepts a user ID and a password together with a use request from a terminal, the authentication request acceptance unit accepts the authentication request. The terminal authentication program transmission unit transmits a terminal authentication program to a terminal device. The authentication result transmission unit causes the terminal device to execute the terminal authentication program so as to cause the authentication server to execute authentication. The authentication result transmission unit receives the received authentication result from the terminal device and transmits the authentication result to the application server.

12 Claims, 7 Drawing Sheets

VIRTUAL AUTHENTICATION PROXY SERVER AND TERMINAL AUTHENTICATION SERVER

CROSS-REFERENCE TO RELATED APPLICATION

This application is based on and claims priority under 35 USC 119 from Japanese Patent Application No. 2010-099671 filed on Apr. 23, 2010.

BACKGROUND

Technical Field

This invention relates to a communication control device, a computer-readable medium, and a communication control system.

SUMMARY

According to an aspect of the invention, a communication control device includes an acceptance unit, a transmission unit and an authentication result transmission unit. When a server which cannot use authentication service provided by an external authentication server accepts authentication information for authenticating a user in the external authentication server together with a use request from an external terminal which can use the authentication service provided by the external authentication server, the acceptance unit accepts an authentication request of the authentication information from the server. When the acceptance unit accepts the authentication request, the transmission unit transmits the authentication information and a terminal authentication program to the external terminal so that the terminal authentication program is executed in the external terminal. The terminal authentication program causes the external terminal to function as (i) an authentication request unit which transmits the authentication information to the external authentication server and requests the external authentication server to authenticate said transmitted authentication information and (ii) a result transmission unit which transmits the result of the authentication request received from the external authentication server to the communication control device in response to the authentication request. The authentication result transmission unit transmits the authentication result of the external authentication server received from the external terminal to the server.

BRIEF DESCRIPTION OF THE DRAWINGS

Exemplary embodiments of the invention will be described in detail based on the following figures, wherein.

DETAILED DESCRIPTION

Figure 1:
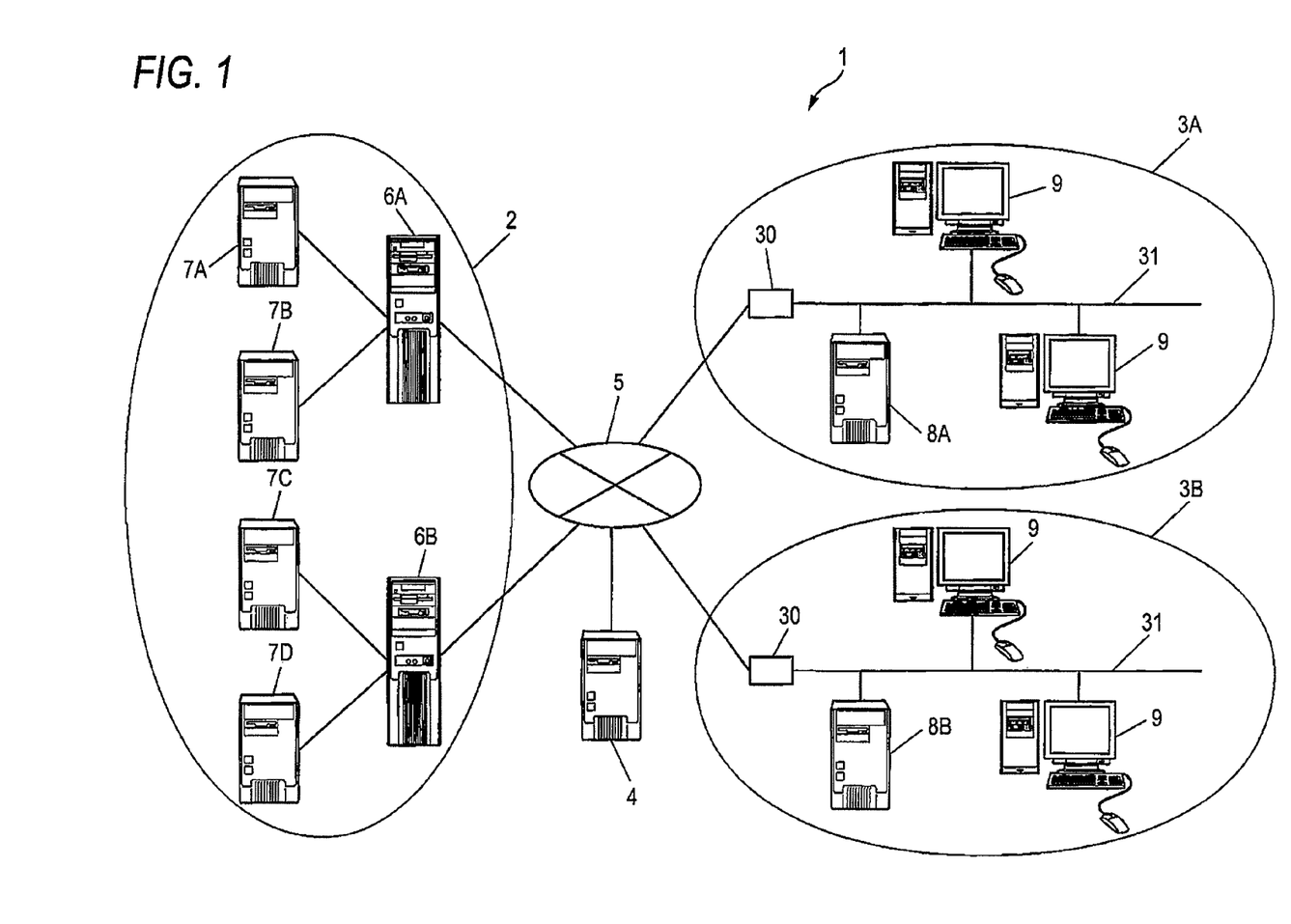
FIG. 1 is a drawing to show an example of the configuration of a communication control system according to a first embodiment of the invention.

FIG. 1 is a drawing to show an example of the configuration of a communication control system according to a first embodiment of the invention.

A communication control system 1 has a cloud computing platform 2, enterprise networks 3A and 3B, an authentication station 4, and the like, which are connected so that they can communicate with each other through Internet 5.

The cloud computing platform 2 starts a virtual machine and causes various programs to be executed on the started virtual machine in response to a request of a terminal device 9, thereby providing service of execution of web application, etc. In the embodiment, it is assumed that a virtual authentication proxy server 6A, application servers 7A and 7B, a virtual authentication proxy server 6B, application servers 7C and 7D, etc., already start and operate. The numbers of virtual authentication proxy servers and application servers each may be one or may be two or more and their connection method is not limited to the example shown in the figure.

When any of the application servers 7A to 7D accepts a request of service requiring authentication from the terminal device 9, the virtual authentication proxy server 6A or 6B accepts the authentication request from the application server 7 and causes an authentication server 8A or 8B to authenticate the request. The virtual authentication proxy server 6A is used by the terminal device 9 of the enterprise network 3A and the virtual authentication proxy server 6B is used by the terminal device 9 of the enterprise network 3B.

The application servers 7A to 7D provide service of web application, etc., in response to a request of the terminal device 9. When any of the application servers 7A to 7D accepts a request of service requiring authentication from the terminal device 9, the application server 7 requests the virtual authentication proxy server 6A or 6B to authenticate the request. The application servers 7A and 7B can be used from the terminal device 9 of the enterprise network 3A and the application servers 7C and 7D can be used from the terminal device 9 of the enterprise network 3B.

The enterprise network 3A has the authentication server 8A, the terminal device 9, and the like, which are connected so that they can communicate with each other through a LAN (Local Area Network) 31. The enterprise network 3A limits communications the Internet 5 outside the LAN 31 through a firewall 30. This means that the authentication server 8A and the terminal device 9 cannot be used from an external device not connected to the enterprise network 3A. The LAN 31 may be wired or may be wireless. The number of terminals may be one or may be two or more and is not limited by the example shown in the figure.

The authentication server 8A has, for example, a previously registered user name and a password corresponding to the user name, and outputs the authentication result in response to an authentication request. Authentication is not limited to authentication using the user name and the password and authentication using an IC card and authentication information of vein authentication, etc., may be used.

The terminal device 9 is a client for the application servers 7A to 7D, has a display section of an LCD, etc., an operation section of a keyboard, a mouse, etc., a control section made up of a CPU, etc., and the like, requests the application server 7A to execute web application in response to operation of the operation section of the user, and displays an operation image, etc., on the display section based on image information, etc., output as response of the application servers 7A to 7D.

The enterprise network 3B is a network of an enterprise different from the enterprise of the enterprise network 3C; the configuration of the enterprise network 3B is similar to that of the enterprise network 3A and therefore will not be discussed again.

The authentication station 4 receives and registers a public key from the outside and issues an electronic public key certificate describing the public key and the owner of the public key.

Figure 2:
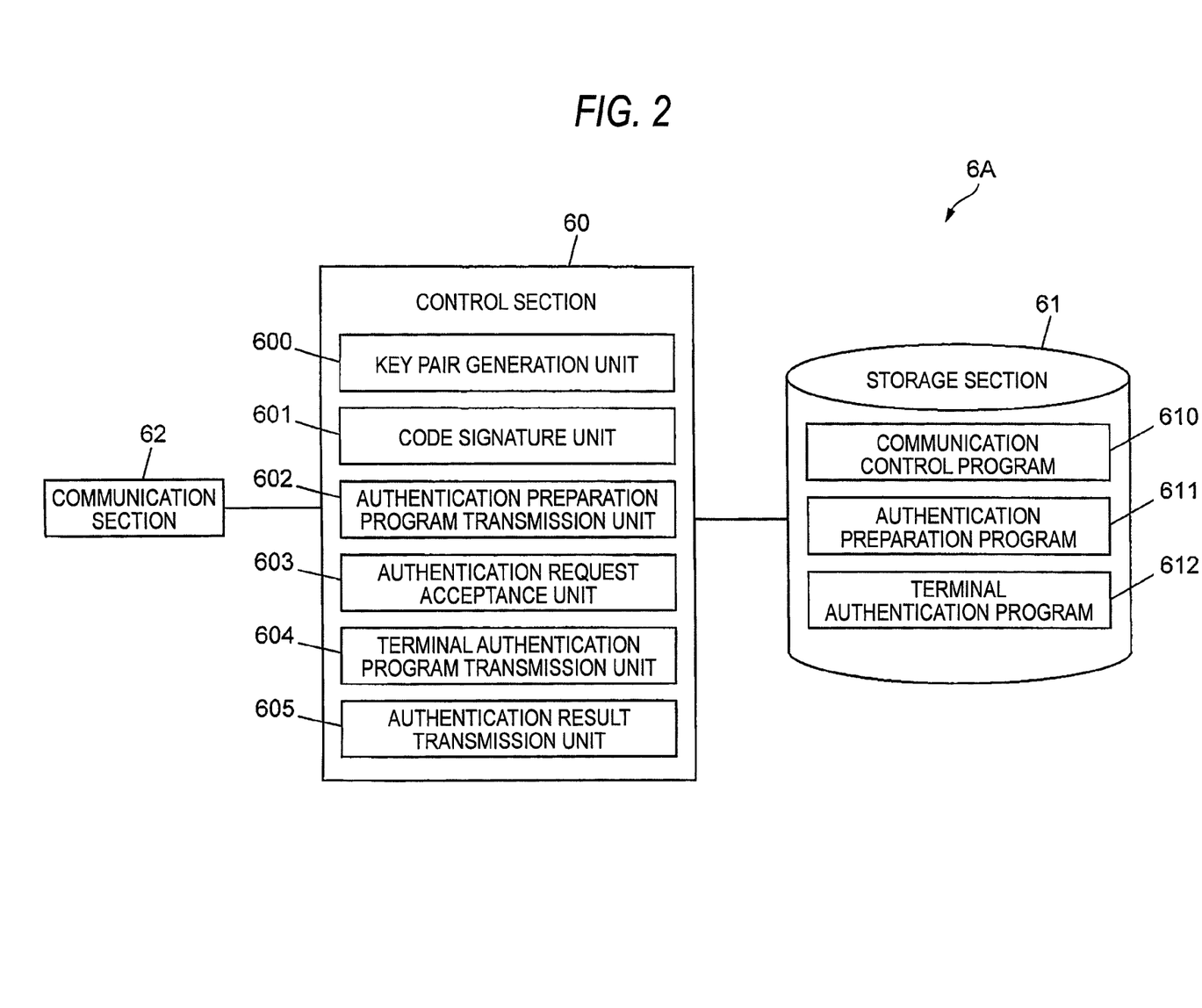
FIG. 2 is a block diagram to show an example of the configuration of a virtual authentication proxy server.

FIG. 2 is a block diagram to show an example of the configuration of the virtual authentication proxy server 6A.

The virtual authentication proxy server 6A has a control section 60 made up of a CPU, etc., for controlling the sections and executing various programs, a storage section 61 implemented as storage of an HDD (Hard Disk Drive), flash memory, etc., and a communication section 62 for communicating with the outside through the Internet 5.

The control section 60 executes a communication control program 610, thereby functioning as a key pair generation unit 600, a code signature unit 601, an authentication preparation program transmission unit 602, an authentication request acceptance unit 603, a terminal authentication program transmission unit 604, an authentication result transmission unit 605, and the like.

The key pair generation unit 600 generates a private key and a public key.

The code signature unit 601 adds an electronic signature and an electronic certificate to an authentication preparation program 611 described later and a terminal authentication program 612 described later and places a code signature.

Upon acceptance of an acquisition request, the authentication preparation program transmission unit 602 transmits the authentication preparation program 611 for acquiring the terminal authentication program 612 on which the code signature unit 601 places a code signature to the application server 7A, 7B.

The authentication request acceptance unit 603 accepts authentication requests of the application server 7A, 7B.

The terminal authentication program transmission unit 60 transmits the terminal authentication program 612 on which the code signature unit 601 places a code signature for transmitting the authentication request of the application server 7A, 7B to the authentication server 8A or 8B by the terminal device 9 to the terminal device 9.

The authentication result transmission unit 605 verifies the authentication result of the authentication server 8A and transmits it to the application server 7A, 7B.

The storage section stores information of the communication control program 610 for causing the control unit to function as the unit 600 to 605 described above, the authentication preparation program 611, for example, described in a language of Java (registered trademark), Applet, etc., and the terminal authentication program 612, etc. The authentication preparation program 611 and the terminal authentication program 612 may be generated at the transmission time to an external device without previously stored in the storage section 61.

The operation of the communication control system will be discussed below with reference to FIGS. 1 to 4. In the description to follow, an operation example of the application server 7A, the virtual authentication proxy server 6A, and the terminal device 9 and the authentication server 8A in the enterprise network 3A is shown; when a device having the corresponding function among the devices shown in FIG. 1 operates, the device operates in a similar manner.

(1) Preparation Operation

Figure 3A:
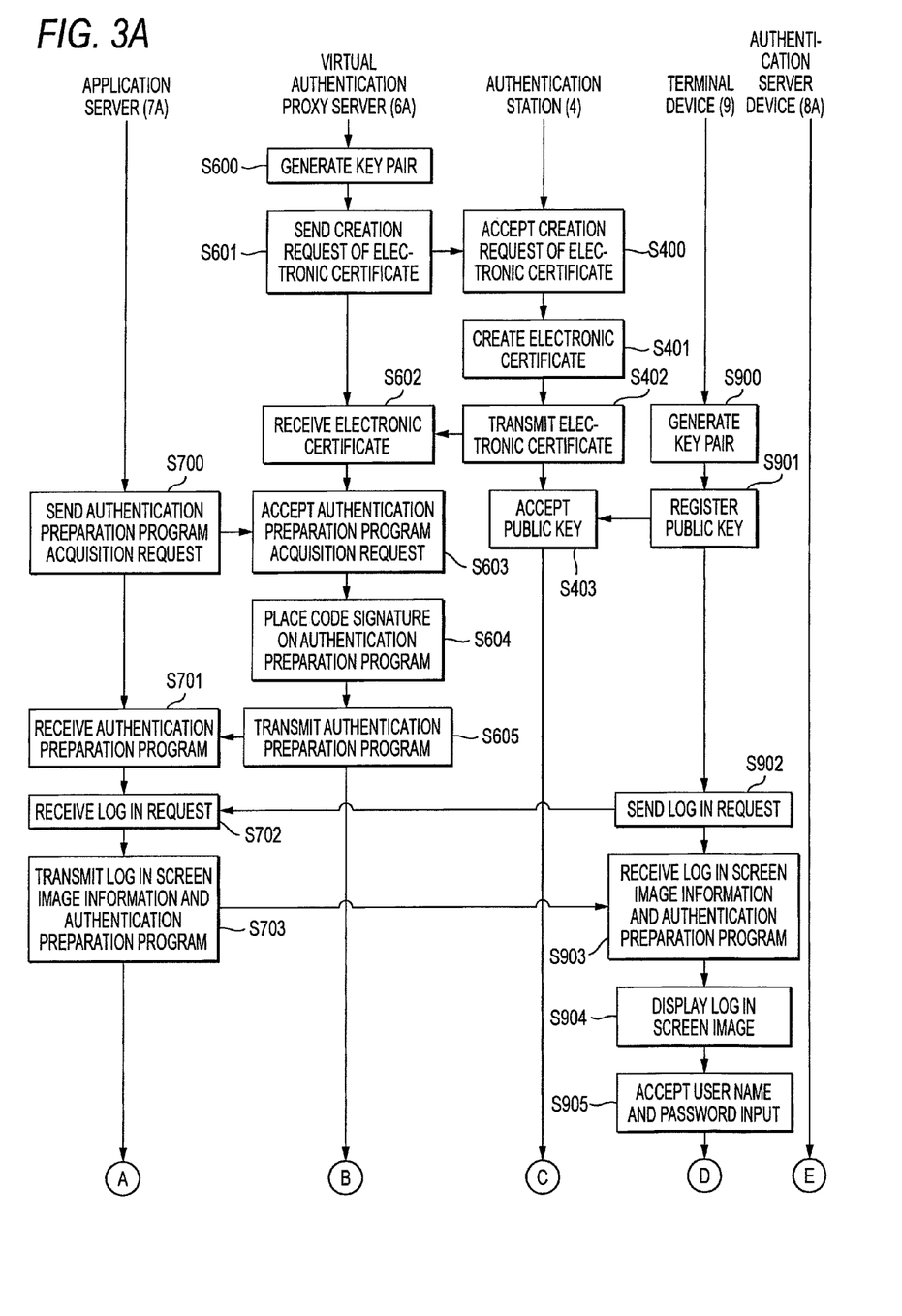
FIG. 3A is a flowchart to show an operation example of the communication control system.
Figure 3B:
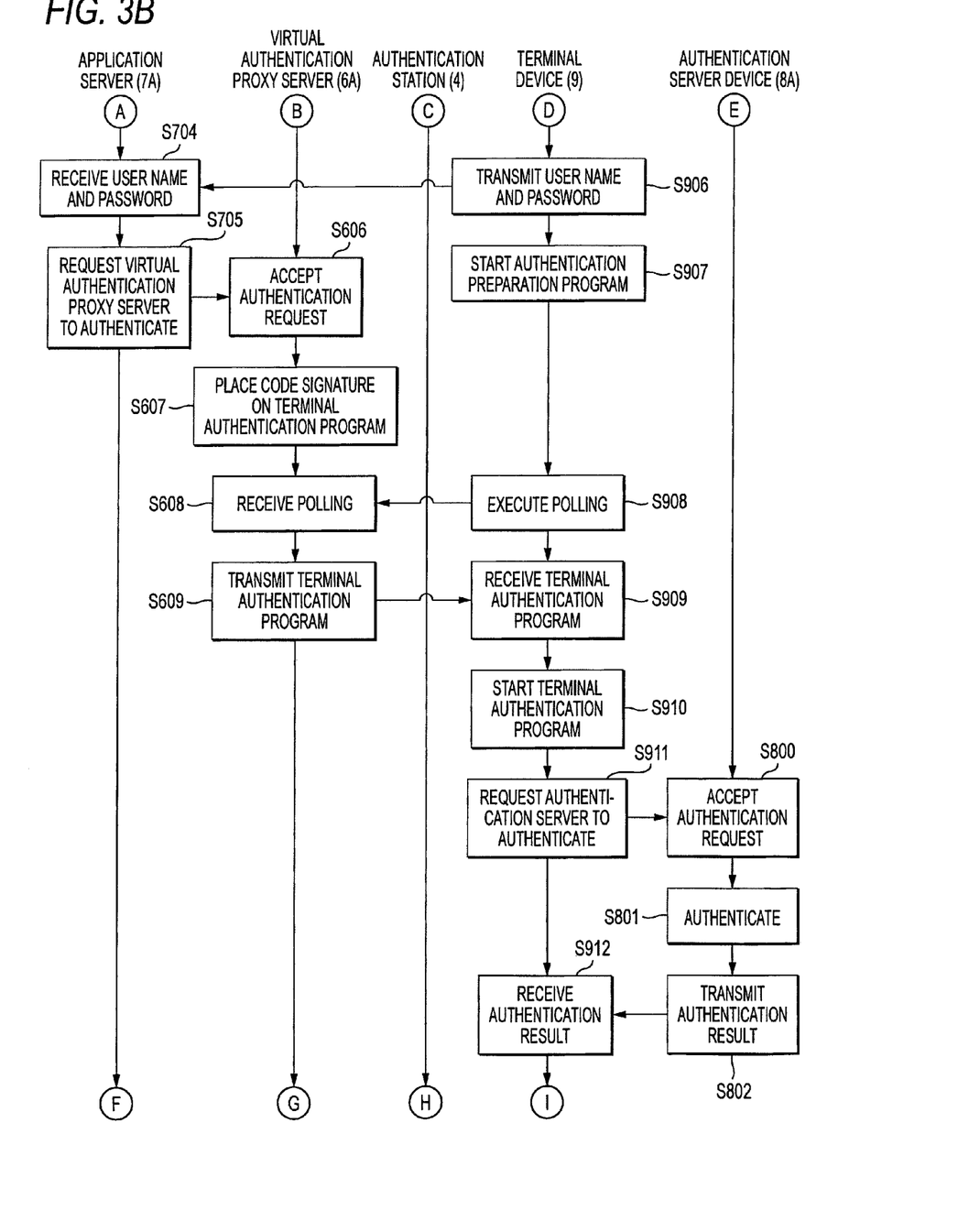
FIG. 3B is a flowchart to show an operation example of the communication control system.
Figure 3C:
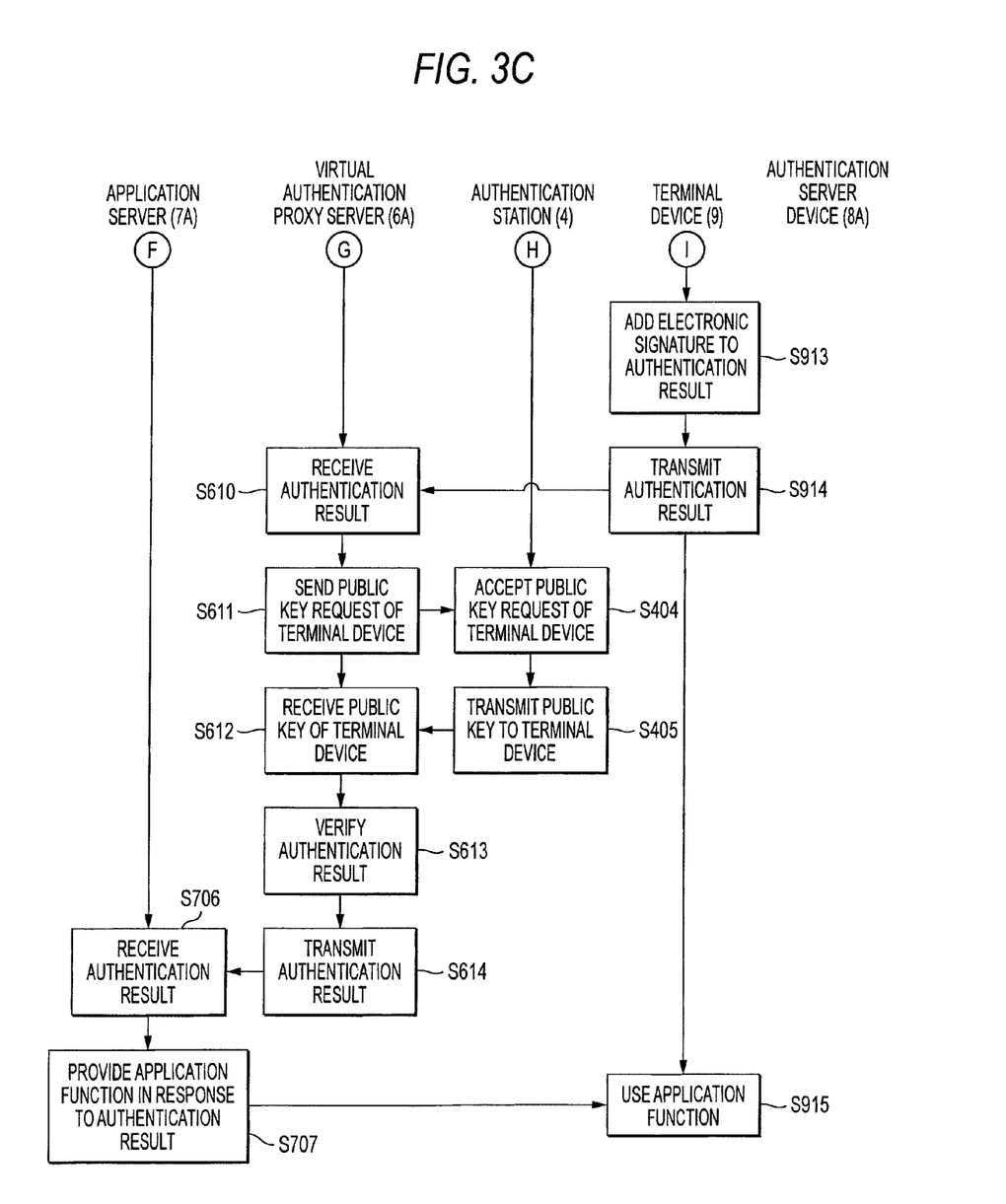
FIG. 3C is a flowchart to show an operation example of the communication control system.

FIGS. 3A to 3C are flowcharts to show an example of the operation of the communication control system 1.

To begin with, the key pair generation unit 600 of the virtual authentication proxy server 6A generates a key pair of a private key and a public key (S600). Next, the code signature unit 601 requests the authentication station 4 to create an electronic certificate based on the public key (S601).

Figure 4:
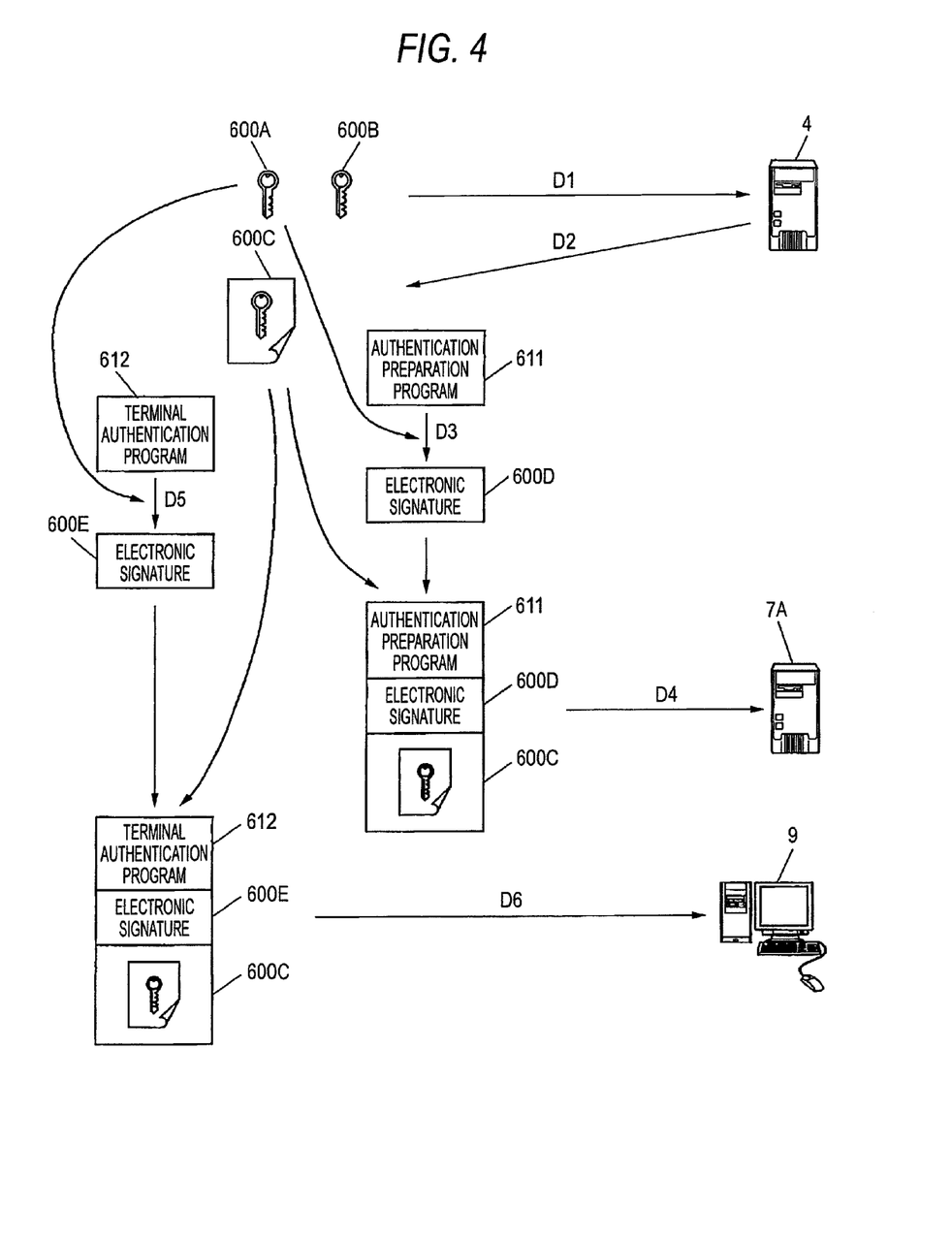
FIG. 4 is a drawing to describe a generation example of a key pair of a key pair generation unit and a code signature example of a code signature unit on a program.

FIG. 4 is a drawing to describe a generation example of a key pair of the key pair generation unit 600 and a code signature example of the code signature unit 601 on a program.

The code signature unit 601 requests (D1) the authentication station 4 to create an electronic certificate based on a public key 600B, whereby the authentication station 4 creates an electronic certificate 600C (S401) and transmits (D2) the electronic certificate 600C to the virtual authentication proxy server 6A (S402).

The code signature unit 601 receives the electronic certificate 600C (S602) and temporarily stores it in memory (not shown).

On the other hand, the application server 7A requests the virtual authentication proxy server 6A to acquire the authentication preparation program 611 (S700).

The authentication preparation program transmission unit 602 of the virtual authentication proxy server 6A accepts the acquisition request of the application server 7A (S603). The code signature unit 601 creates (D3) an electronic signature 600D of the authentication preparation program 611 based on a private key 600A and adds the electronic signature 600D and the electronic certificate 600C, thereby placing a code signature on the authentication preparation program 611 (S604) and transmits (D4) the authentication preparation program 611 on which the code signature is placed to the application server 7A (S605).

The application server 7A receives the authentication preparation program 611 on which the code signature is placed from the virtual authentication proxy server 6A (S701).

The terminal device 9 generates a key pair of a private key and a public key by a key pair generation unit (not shown) (S900) and registers the public key in the authentication station 4 (S901). The authentication station 4 accepts and registers the public key from the terminal device 9 (S403).

(2) Authentication Request Operation

To begin with, to use web application, the user operates the termination device 9. The termination device 9 communicates with the application server 7A through the Internet in response to the operation and makes a log in request (S902).

The application server 7A receives the log in request of the terminal device 9 (702) transmits image information for displaying a log in screen on the display section of the terminal device 9 and the authentication preparation program 611 (S703). The authentication preparation program 611 is a program on which code signature is placed and is built in the image information for transmission.

Next, the terminal device 9 receives the log in screen image information and the authentication preparation program 611 (S903) and displays a log in screen image (S904).

The user references the log in screen image and operates the operation section to enter the user name and the password. The terminal device 9 accepts the entered user name and password (S905) and transmits them to the application server 7A (S906).

The application server 7A receives the use name and the password from the terminal device 9 (S704) and requests the virtual authentication proxy server 6A to authenticate the received user name and password (S705).

The authentication request acceptance unit 603 of the virtual authentication proxy server 6A accepts the authentication request from the application server 7A (S606). With the authentication request as a trigger, as shown in FIG. 4, the code signature unit 601 creates (D5) an electronic signature 600E of the terminal authentication program 612 based on the private key 600A and adds the electronic signature 600E and the electronic certificate 600C to the terminal authentication program 612, thereby placing a code signature (S607).

On the other hand, the terminal device 9 starts the authentication preparation program 611 (S907) and executes the authentication preparation program 611, thereby pooling the virtual authentication proxy server 6A (S908). When starting the authentication preparation program 611, the terminal device 9 verifies the code signature, thereby checking presence or absence of tampering and information of the program creator, etc.

When receiving polling from the terminal device 9 (S608), the terminal authentication program transmission unit 604 transmits (D6) the terminal authentication program 612 on which the code signature is placed to the terminal device 9 (S609). The terminal authentication program transmission unit 604 transmits the user name, the password, and an authentication session ID together with the terminal authentication program 612.

The terminal device 9 receives the terminal authentication program 612, the user name, the password, and the authentication session ID from the application server 7A (S909), verifies the code signature, and starts the terminal authentication program 612 (S910).

(3) Authentication Execution Operation

Next, the terminal device 9 executes the terminal authentication program 612, thereby requesting the authentication server 8A connected by the LAN 31 to authenticate the user name and the password (S911).

The authentication server 8A accepts the authentication request from the terminal device 9 (S800) and checks whether or not the user name and the password match those previously registered in a database for authentication (S801). Next, the authentication server 8A transmits the authentication result to the terminal device 9 (S802).

The terminal device 9 receives the authentication result from the authentication server 8A (S912), generates an electronic signature based on the private key generated at step S900 and adds the electronic signature to the authentication result (S913). The terminal device 9 transmits the authentication result to which the electronic signature is added to the virtual authentication proxy server 6A together with the authentication session ID (S914).

The authentication result transmission unit 605 of the virtual authentication proxy server 6A receives the authentication result from the terminal device 9 (S610) and sends request for acquiring the public key of the terminal device 9 to the authentication station 4 for verification (S611).

The authentication station 4 accepts the acquisition request of the public key of the terminal device 9 (S404) and transmits the registered public key of the terminal device 9 to the virtual authentication proxy server 6A (S405).

The authentication result transmission unit 605 of the virtual authentication proxy server 6A receives the public key of the terminal device 9 from the authentication station 4 (S612), verifies the authentication result based on the received public key (S613), and if no problem is involved in the verification, transmits the authentication result to the application server 7A (S614).

The application server 7A receives the authentication result from the virtual authentication proxy server 6A (S706) and provides the function of web application based on the authentication result (S707). If the authentication result is NG, the function is not provided or the limited function is provided.

The terminal device 9 uses the function of the web application provided from the application server (S915).

A second embodiment of the invention differs from the first embodiment in that a user name and a password input to a terminal device is not directly transmitted to the outside of an enterprise network 3A.

Figure 5:
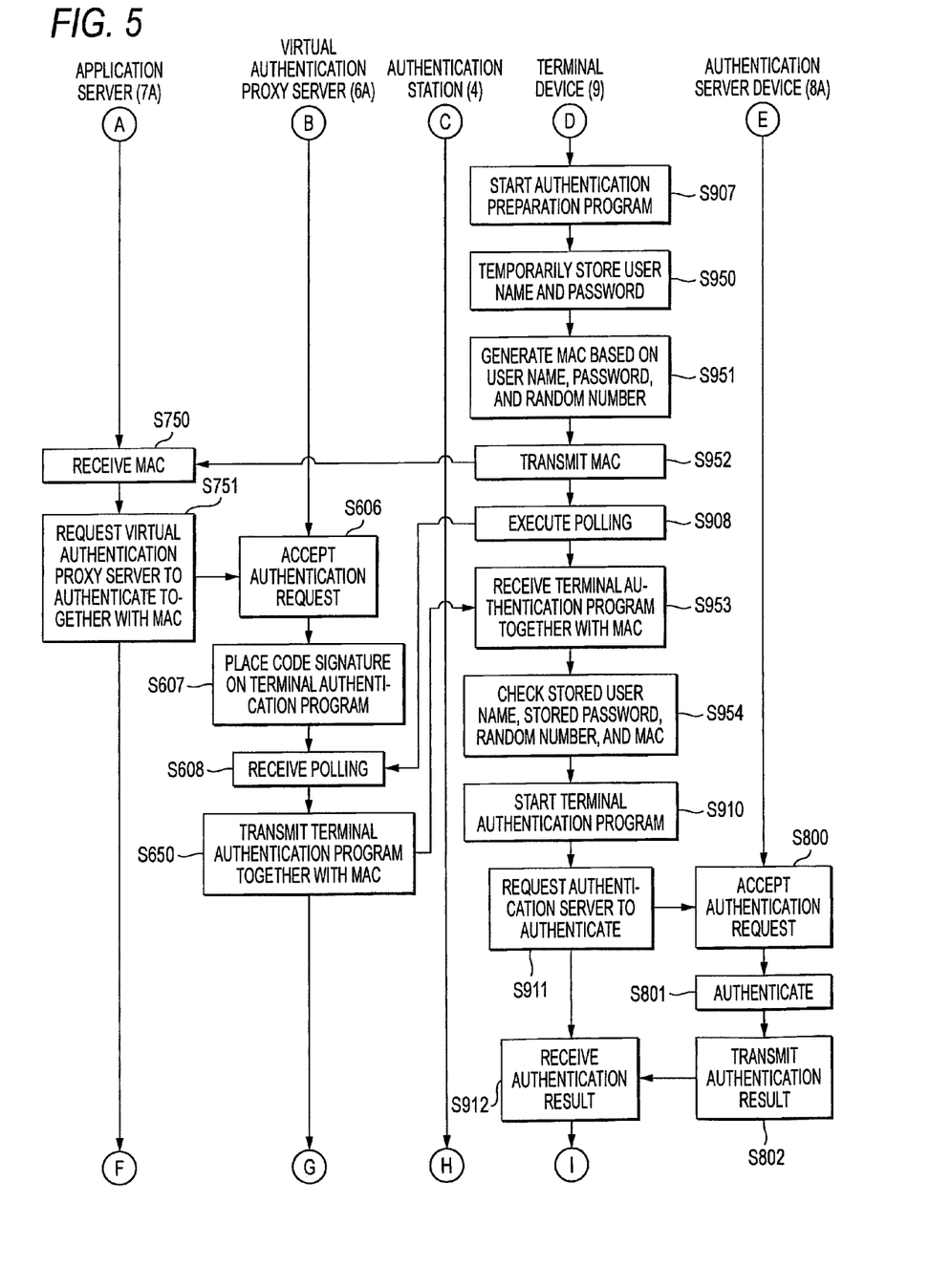
FIG. 5 is a flowchart to show an operation example of a communication control system according to a second embodiment of the invention.

A communication control system 1 first executes the operation described with FIG. 3A, of the operation described in the first embodiment. After a terminal device 9 executes step S905, the following operation is executed:

FIG. 5 is a flowchart to show an example of the operation of the communication control system 1 according to the second embodiment of the invention.

The terminal device 9 starts an authentication preparation program 611 (S907) and executes the authentication preparation program 611, thereby temporarily storing the user name and the password accepted at step S905 in memory (not shown) (S950). Next, the terminal device 9 executes the authentication preparation program 611, thereby generating MAC (Message Authentication Code) based on the user name, the password, and a random number (S951), and transmits the MAC to an application server 7A (S952).

The application server 7A receives the MAC from the terminal device 9 (S750) and requests a virtual authentication proxy server 6A to authenticate the received MAC (S751).

An authentication request acceptance unit 603 of the virtual authentication proxy server 6A accepts the authentication request from the application server 7A (S606). With the authentication request as a trigger, a code signature unit 601 creates (D5) an electronic signature 600E of a terminal authentication program 612 based on a private key 600A and adds the electronic signature 600E and an electronic certificate 600C to the terminal authentication program 612, thereby placing a code signature (S607).

On the other hand, the terminal device 9 executes the authentication preparation program 611, thereby pooling the virtual authentication proxy server 6A (S908).

When receiving polling from the terminal device 9 (S608), a terminal authentication program transmission unit 604 transmits (D6) the terminal authentication program 612 on which the code signature is placed to the terminal device 9 together with the MAC (S650). The terminal authentication program transmission unit 604 transmits an authentication session ID together with the terminal authentication program 612 and the MAC.

The terminal device 9 receives the terminal authentication program 612, the MAC, and the authentication session ID from the application server 7A (S953), and checks and verifies the user name and the password temporarily stored at step S950, the random number, and the received MAC (S954). Next, the terminal device 9 starts the terminal authentication program 612 (S910).

Next, the terminal authentication program 612 of the terminal device 9 requests an authentication server 8A connected by a LAN 31 to authenticate the user name and the password (S911).

The authentication server 8A accepts the authentication request from the terminal device 9 (S800) and checks whether or not the user name and the password match those previously registered in a database for authentication (S801). Next, the authentication server 8A transmits the authentication result to the terminal device 9 (S802).

The terminal device 9 receives the authentication result from the authentication server 8A (S912), generates an electronic signature based on a private key generated at step S900 and adds the electronic signature to the authentication result (S913). The terminal device 9 transmits the authentication result to which the electronic signature is added to the virtual authentication proxy server 6A together with the authentication session ID (S914).

After this, the communication control system 1 executes the operation described with FIG. 4C, of the operation described in the first embodiment.

The invention is not limited to the embodiments described above and various modifications can be made without departing from the spirit and scope of the invention.

The communication control program 610, the authentication preparation program 611, and the terminal authentication program 612 used in the embodiments described above may be read from a storage medium of a CD-ROM, etc., into the storage section in the device or may be downloaded from a server, etc., connected to a network of the Internet, etc., into the storage section in the device. Some or all of the units 600 to 605 used in the embodiments described above may be implemented as hardware of an ASIC, etc.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication control device comprising:
   an acceptance unit that, in response to a server which cannot use authentication service provided by an external authentication server accepting authentication information for authenticating a user in the external authentication server together with a use request from an external terminal which can use the authentication service provided by the external authentication server, accepts an authentication request of the authentication information from the server;
   a transmission unit, in response to the acceptance unit accepting the authentication request, transmits the authentication information and a terminal authentication program to the external terminal so that the terminal authentication program is verified against an electronic certificate based on a public key of the external terminal and an electronic signature based on a private key of the external terminal and executed in the external terminal, the terminal authentication program having the electronic certificate and the electronic signature attached thereto, and the terminal authentication program causing the external terminal to function as (i) an authentication request unit which transmits the authentication information to the external authentication server and requests the external authentication server to authenticate said transmitted authentication information and (ii) a result transmission unit which transmits the result of the authentication request received from the external authentication server to the communication control device in response to the authentication request; and
   an authentication result transmission unit that transmits the authentication result of the external authentication server received from the external terminal to the server.

2. The communication control device according to claim 1, further comprising:
   a key pair generation unit that generates a private key and a public key; and
   a code signature unit that adds the electronic certificate and the electronic signature to the terminal authentication program.

3. The communication control device according to claim 1, wherein the server and the acceptance unit accept coded authentication information as the authentication information.

4. The communication control device according to claim 1, wherein the external terminal generates the private key and the public key and adds an authentication electronic signature based on the private key to the authentication result, and
   the authentication result transmission unit verifies the authentication result received form the external terminal based on the public key.

5. The communication control device according to claim 1, wherein the authentication information is a message authentication code (MAC) generated based on a user name, a password, and a random number.

6. The communication control device according to claim 5, wherein the transmission unit transmits the terminal authentication program and the MAC to external terminal so that the terminal authentication program is verified against the electronic certificate, the electronic signature, and the MAC.

7. A non-transitory computer-readable medium storing a program, which when executed by a computer causes the computer to perform a communication control method, the communication control method comprising:
   accepting an authentication request of authentication information from a server that cannot use authentication service provided by an external authentication server, in response to the server accepting the authentication information for authenticating a user in the external authentication server together with a use request from an external terminal which can use the authentication service provided by the external authentication server;
   transmitting, in response to accepting the authentication request, the authentication information and a terminal authentication program to the external terminal so that the terminal authentication program is verified against an electronic certificate based on a public key of the external terminal and an electronic signature based on a private key of the external terminal and executed in the external terminal, the terminal authentication program having the electronic certificate and the electronic signature attached thereto, and the terminal authentication program causing the external terminal to function as (i) an authentication request unit which transmits the authentication information to the external authentication server and requests the external authentication server to authenticate said transmitted authentication information and (ii) a result transmission unit which transmits the result of the authentication request received from the external authentication server to the communication control device in response to the authentication request; and
   transmitting the authentication result of the external authentication server received from the external terminal to the server.

8. The non-transitory computer-readable medium according to claim 7, wherein the authentication information is a message authentication code (MAC) generated based on a user name, a password, and a random number.

9. The non-transitory computer-readable medium according to claim 8, wherein the transmitting comprises transmitting the terminal authentication program and the MAC to external terminal so that the terminal authentication program is verified against the electronic certificate, the electronic signature, and the MAC.

10. A communication control system comprising:
an external authentication server that authenticates a user based on authentication information;
an external terminal that can use an authentication service of the external authentication server;
a communication control device that cannot use the authentication service of the external authentication server; and
a server that cannot use the external authentication server and that outputs an authentication request to the communication control device when accepting authentication information together with a use request from the external terminal,
wherein in response to accepting the authentication request of the authentication information from the server, the communication control device transmits the authentication information and a terminal authentication program to the external terminal so that the terminal authentication program is verified against an electronic certificate based on a public key of the external terminal and an electronic signature based on a private key of the external terminal and executed in the external terminal, the terminal authentication program having the electronic certificate and the electronic signature attached thereto, and
wherein the external terminal verifies the terminal authentication program against the electronic certificate and the electronic signature and executes the terminal authentication program, the terminal authentication program controlling the external terminal to function as (i) an authentication request unit which transmits the authentication information to the external authentication server and requests the external authentication server to authenticate said transmitted authentication information and (ii) a result transmission unit which transmits the result of the authentication request received from the external authentication server to the communication control device in response to the authentication request, and
wherein the communication control device transmits the authentication result of the external authentication server received from the external terminal to the server.

11. The communication control system according to claim 10, wherein the authentication information is a message authentication code (MAC) generated based on a user name, a password, and a random number.

12. The communication control system according to claim 11, wherein the communication control device transmits the terminal authentication program and the MAC to external terminal so that the terminal authentication program is verified against the electronic certificate, the electronic signature, and the MAC.

* * * * *